_(12)_ United States Patent
Tietjen et al.

(10) Patent No.: US 8,712,631 B2
(45) Date of Patent: Apr. 29, 2014

(54) SYSTEM AND METHOD FOR ACCESS OF USER ACCOUNTS ON REMOTE SERVERS

(71) Applicants: Byron Tietjen, Baldwinsville, NY (US); Greg Gardella, Independence, MN (US)

(72) Inventors: Byron Tietjen, Baldwinsville, NY (US); Greg Gardella, Independence, MN (US)

(73) Assignee: Nordic Capital Partners, LLC, Plymouth, MN (US)

( * ) Notice: Subject to any disclaimer, the term of this patent is extended or adjusted under 35 U.S.C. 154(b) by 0 days.

(21) Appl. No.: 13/725,774

(22) Filed: Dec. 21, 2012

(65) Prior Publication Data

US 2013/0212648 A1    Aug. 15, 2013

Related U.S. Application Data

(63) Continuation-in-part of application No. 13/461,751, filed on May 1, 2012, now Pat. No. 8,433,463.

(60) Provisional application No. 61/617,277, filed on Mar. 29, 2012, provisional application No. 61/623,222, filed on Apr. 12, 2012, provisional application No. 61/621,497, filed on Apr. 7, 2012, provisional application No. 61/621,630, filed on Apr. 9, 2012, provisional application No. 61/621,495, filed on Apr. 7, 2012, provisional application No. 61/603,330, filed on Feb. 26, 2012, provisional application No. 61/597,045, filed on Feb. 9, 2012, provisional application No. 61/663,557, filed on Jun. 23, 2012.

(51) Int. Cl.
*G06F 3/16* (2006.01)
*G06F 7/00* (2006.01)
*H04H 20/00* (2008.01)
*H04H 20/79* (2008.01)
*H04H 20/89* (2008.01)
*H04H 20/95* (2008.01)
*H04L 29/06* (2006.01)
*H04N 21/00* (2011.01)
*H04N 21/218* (2011.01)
*H04N 21/232* (2011.01)
*H04N 21/233* (2011.01)
*H04N 21/234* (2011.01)
*H04N 21/439* (2011.01)

(52) U.S. Cl.
CPC .................................... *H04L 63/10* (2013.01)
USPC ........ 701/31.5; 701/32.6; 701/32.7; 701/481; 701/483; 701/486; 701/522; 701/537; 704/E19.048; 725/98

(58) Field of Classification Search
CPC ... H04N 21/00; H04N 21/218; H04N 21/233; H04N 21/2335; H04N 21/234; H04N 21/439
USPC .............. 701/31.5, 32.6, 32.7, 481, 483, 486, 701/522, 537; 704/E19.048; 725/98
See application file for complete search history.

(56) References Cited

U.S. PATENT DOCUMENTS 7,739,723 B2 *    6/2010    Rogers et al. ..................... 726/2

(Continued)

*Primary Examiner* — Mary Cheung
*Assistant Examiner* — Atul Trivedi
(74) *Attorney, Agent, or Firm* — Craige Thompson; Thompson Patent Law Offices

(57) ABSTRACT

In certain embodiments, the system of the invention automatically replicates a user's personal computing environment and provides associated remote server access using authentication credentials and data files supplied by a local handheld device as coordinated by session level software common to the handheld device, the replicated system, the system on which the replication occurs, and the remote servers. The application enables a handheld computing device to transfer a user's various online account credentials to a user's other computing devices securely and automatically. Thereafter the other computing device accesses a user's cloud-based storage and various on-line accounts and also pulls selected documents, bookmarks and related information directly from a user's handheld. The other computing device thereby essentially becomes a clone of a user's primary personal computer, complete with bookmarks, email account access, documents in a user's desktop and My Documents folder, pictures, music, and on-line content subscription access.

10 Claims, 15 Drawing Sheets

(56) References Cited

U.S. PATENT DOCUMENTS

| | | | |
|---|---|---|---|
| 7,870,092 B2* | 1/2011 | Scott et al. | 707/609 |
| 7,937,484 B2* | 5/2011 | Julia et al. | 709/231 |
| 7,987,492 B2* | 7/2011 | Liwerant et al. | 725/115 |
| 8,095,566 B2* | 1/2012 | Thomas | 707/796 |
| 8,112,810 B2* | 2/2012 | Risan et al. | 726/26 |
| 8,112,815 B2* | 2/2012 | Risan et al. | 726/29 |
| 8,122,248 B2* | 2/2012 | Risan et al. | 713/164 |
| 8,375,019 B2* | 2/2013 | Salinas | 707/706 |
| 2002/0156832 A1* | 10/2002 | Duri et al. | 709/203 |
| 2005/0144195 A1* | 6/2005 | Hesselink et al. | 707/201 |
| 2005/0144200 A1* | 6/2005 | Hesselink et al. | 707/204 |
| 2005/0149481 A1* | 7/2005 | Hesselink et al. | 707/1 |
| 2007/0100806 A1* | 5/2007 | Ramer et al. | 707/3 |
| 2007/0179955 A1* | 8/2007 | Croft et al. | 707/9 |
| 2007/0198633 A1* | 8/2007 | Thibeault | 709/203 |
| 2007/0233732 A1* | 10/2007 | Porter et al. | 707/104.1 |
| 2008/0004904 A1* | 1/2008 | Tran | 705/2 |
| 2008/0163315 A1* | 7/2008 | Liwerant et al. | 725/98 |
| 2008/0163316 A1* | 7/2008 | Liwerant et al. | 725/98 |
| 2008/0201225 A1* | 8/2008 | Maharajh et al. | 705/14 |
| 2008/0299953 A1* | 12/2008 | Rao | 455/414.1 |
| 2010/0114968 A1* | 5/2010 | Dean | 707/796 |
| 2010/0125605 A1* | 5/2010 | Nair et al. | 707/784 |

* cited by examiner

| | | | APPLICATION | | |
|---|---|---|---|---|---|
| | PERIPHERAL | LINK | WATERCRAFT | AUTOMOBILE | DWELLING |
| EDD | REMOTE DISPLAY/S | BLUETOOTH | Somewhat Probable | Somewhat Probable | Possible |
| | | WI-FI | Possible | Possible | Possible |
| | | CABLE | Possible | Somewhat Probable | Somewhat Probable |
| | | OTHER | Possible | Possible | Somewhat Probable |
| EOD | GPS* | BLUETOOTH | Highly Probable | Highly Probable | Highly Probable |
| | | WI-FI | Possible | Possible | Possible |
| | | CABLE | Somewhat Probable | Possible | Possible |
| | | OTHER | Possible | Possible | Possible |
| | RADIO/TV | BLUETOOTH | Highly Probable | Highly Probable | Highly Probable |
| | | WI-FI | Possible | Possible | Possible |
| | | CABLE | Possible | Possible | Possible |
| | | OTHER | Possible | Possible | Possible |
| | DEPTH SOUNDER/ TRANSDUCER | BLUETOOTH | Highly Probable | | |
| | | WI-FI | Possible | | |
| | | CABLE | Somewhat Probable | | |
| | | OTHER | Possible | | |
| | RADAR | BLUETOOTH | Highly Probable | Highly Probable | Highly Probable |
| | | WI-FI | Possible | Possible | Possible |
| | | CABLE | Somewhat Probable | Possible | Possible |
| | | OTHER | Possible | Possible | Possible |
| | THERMO- METER | BLUETOOTH | Highly Probable | Highly Probable | Highly Probable |
| | | WI-FI | Possible | Possible | Possible |
| | | CABLE | Somewhat Probable | Possible | Possible |
| | | OTHER | Possible | Possible | Possible |
| | TACHOMETER | BLUETOOTH | Highly Probable | Highly Probable | |
| | | WI-FI | Possible | Possible | |
| | | CABLE | Somewhat Probable | Possible | |
| | | OTHER | Possible | Possible | |
| | ERB* | BLUETOOTH | Highly Probable | Somewhat Probable | |
| | | WI-FI | Possible | Possible | |
| | | CABLE | Somewhat Probable | Somewhat Probable | |
| | | OTHER | Somewhat Probable | Possible | |
| | MOTION SENSOR | BLUETOOTH | Possible | Possible | Highly Probable |
| | | WI-FI | Possible | Possible | Somewhat Probable |
| | | CABLE | Possible | Possible | Somewhat Probable |
| | | OTHER | Possible | Possible | Somewhat Probable |

\* COULD BE BUILT INTO MSID

FIG. 11

SYSTEM AND METHOD FOR ACCESS OF USER ACCOUNTS ON REMOTE SERVERS

CROSS-REFERENCE TO RELATED CASES

The instant application is related to and claims priority to the following United States provisional patent applications, the entirety of each of which is herein incorporated by reference.

| Serial No. | Title | Filing Date |
|---|---|---|
| 61/617277 | Master/Slave Interface Device | 29 MAR. 2012 |
| 61/623222 | Interfacing Handheld Devices | 12 APR. 2012 |
| 61/621497 | Keystone Synchronization System | 07 APR. 2012 |
| 61/621630 | Interfacing Handheld Devices | 09 APR. 2012 |
| 61/621495 | PhoneBook and TabletBook | 07 APR. 2012 |
| 61/603330 | On-Board System | 26 FEB. 2012 |
| 61/597045 | On Board System | 09 FEB. 2012 |
| 61/663557 | Interfacing Handheld Devices | 23 JUN. 2012 |

This application is also a continuation-in-part of U.S. patent application Ser. No. 13/461,751, entitled "Vehicular Dual Mode Master/Slave Interface," filed May 1, 2012, the entirety of which is herein incorporated by reference.

SUMMARY OF ILLUSTRATIVE EMBODIMENTS

In certain embodiments, the system of the invention automatically replicates a user's personal computing environment and provides associated remote server access using authentication credentials and data files supplied by a local handheld device as coordinated by session level software common to the handheld device, the replicated system, the system on which the replication occurs, and the remote servers. In a preferred implementation, intercommunicating application-to-session level software resides on a user's handheld, computers, tablets, TVs, cars and other computing devices. The application enables a handheld computing device to transfer a user's various online account credentials to a user's other computing devices in an automated and secure manner. Thereafter the other computing device accesses a user's cloud-based storage and various on-line accounts and also pulls selected documents, bookmarks and related information directly from a user's handheld. The other computing device thereby essentially becomes a clone of a user's primary personal computer, complete with bookmarks, email account access, documents in a user's desktop and My Documents folder, pictures, music, and on-line content provide subscription access (e.g. Netflix). In one implementation, a user picks up another person's member's tablet computer or sits in a spouse's car and that computer automatically asks whether the user would like to establish a link between the tablet/car and the user's handheld. If the user answers 'yes,' the tablet/car obtains a user's account credentials from the user's phone through a secure Bluetooth link and proceeds to automatically load a user's music, bookmarks, and desktop documents and also automatically establishes live connections to a user's email account, Netflix/Hulu/Vudu account, and any other on-line accounts which the user has selected.

The details of one or more implementations are set forth in the accompanying drawing and description below. Other features, objects, and advantages will be apparent from the description and drawings, and from the claims.

BRIEF DESCRIPTION OF FIGURES

FIG. 11 is a table of potential applications.

Like reference symbols in various drawing indicate like elements.

DETAILED DESCRIPTION OF ILLUSTRATIVE IMPLEMENTATIONS

Overview of Selected MSID Embodiments

Figure 1:
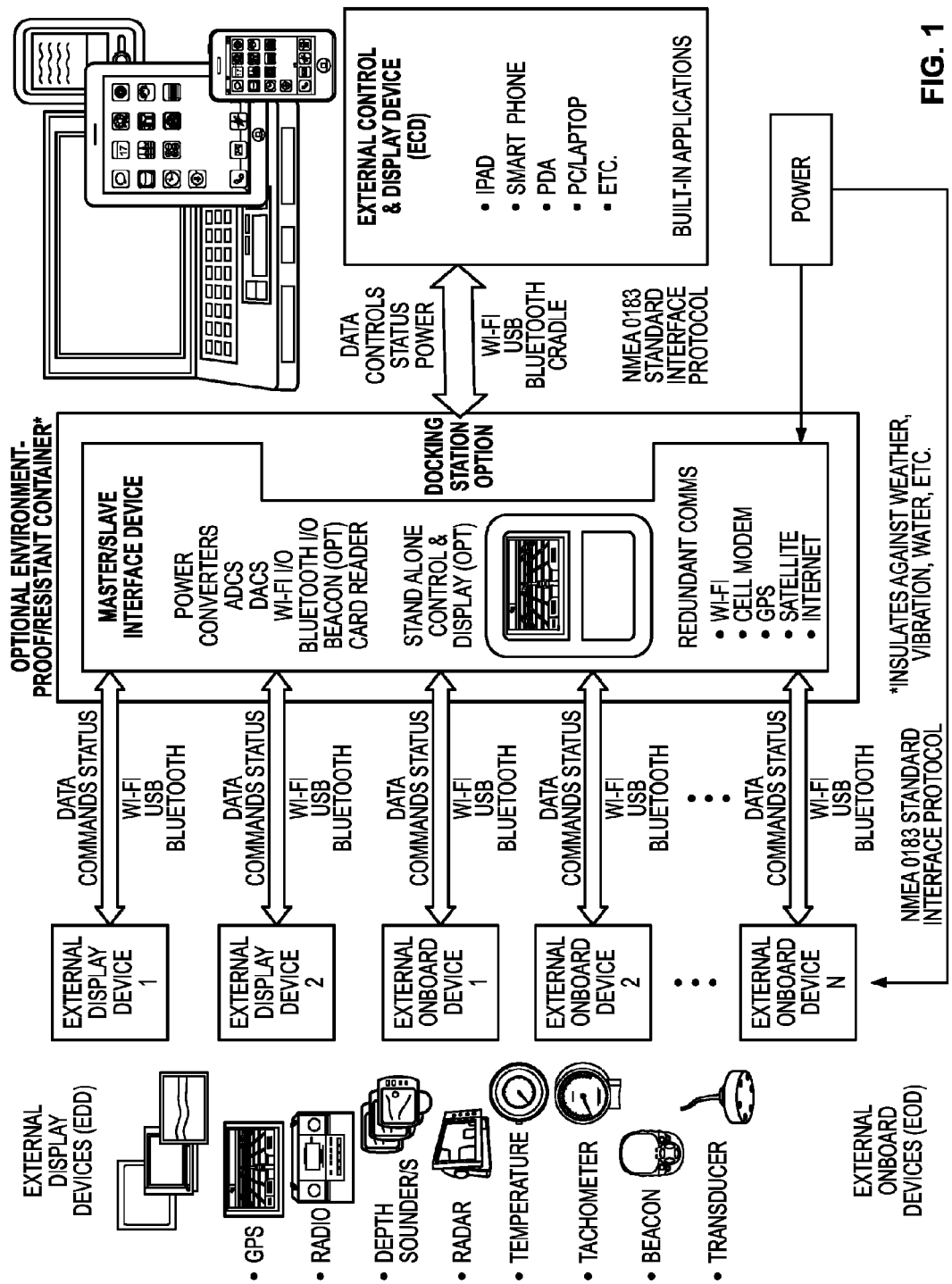
FIG. 1 is a block diagram of an illustrative MSID embodiment.

Many modern vehicles, such as automobiles or watercraft, have a plurality of onboard sensors and display devices capable of measuring and displaying various vehicular-related data. Examples of this include depth sounders and GPS systems on watercraft. It is desirable to have the capability to interface with all the on-board devices with a relatively inexpensive, and probably previously purchased external control & display device (ECD), which, for example, could be a personal hand-held smart device, such as an iPhone, iPad, or other handheld device. In one preferred embodiment, the ECD is a tablet PC or smart phone device which electrically and/or mechanically couples to a protective receptacle on a boat, for example, that provides on-demand lake maps, location information, tactical "fishing guide" advice and emergency services.

The system, in certain embodiments, utilizes a previously purchased tablet or smart phone and thus provides all of this functionality with an absolute minimum of investment in new hardware and on a device running an operating system with which the user is already familiar. The protective receptacle provides power and connects to accessory devices via auxiliary network communication systems such as cellular, GPS, Wi-Fi and satellite systems; auxiliary user interfaces such as keypads, touch screens, speakers and headsets; emergency beacons; sensors that detect one or more of air temperature, water temperature, water depth, barometric pressure, change in barometric pressure, wind direction, wind speed; and protective means that render the on-board system substantially weather proof and shock resistant.

However, if an ECD is not present, it may be appropriate in certain embodiments to have a stand-alone device which serves the same basic purpose as the ECD, displaying selected EOD data as mentioned above. Without an ECD, this data section & display can be independently controlled by built-in control and display functions, or any of the external display devices that are present.

It is common to have remote displays (especially in marine applications) which allow the user to select and display available vehicular-related data. These external display devices (EDD) are usually all-in-one, stand alone Display/Sonar/GPS/Chart Plotter devices that are currently quite complex and expensive. A desired feature of the Master/Slave Interface Device (MSID) therefore would be to enable the same display functionality with less expensive EDDs. The MSID in certain embodiments can enable this with its date routing and device polling capabilities. The MSID can read the commands from each and all of the EDDs, interpret these, and send the requested data to each of the remote displays. In this way, complex and expensive remote displays are not needed in such embodiments, yet independent data selection and display is maintained.

In selected embodiments, the MSID is a device which can serve as master or slave to a plurality of external onboard vehicular devices such as depth sounders, GPS, thermometers, etc. These devices optionally include the capability of wireless communications via Bluetooth or Wi-Fi. In either case, the MSID will have the capability to network with the external onboard devices (EODs) for the purpose of consolidating the considerable amount of data associated with these devices to a user friendly and convenient control and display.

Various embodiments of the MSID can serve as a master control and display, a state in which the MSID selects which EOD data to display, and displays these data on its built-in display. In addition, the MSID will allow an ECD, such as a PDA, iPad, or PC, to act as a master to the aforementioned sensor network. In this state, the MSID acts as a slave to the ECD, merely passing or routing EOD data to the ECD. The MSID will have the capability to automatically sense the presence of an ECD, and allow it to be the master control and display device. This transition may be purely automatic, with the option of a manual input verifying or overriding this decision by the MSID.

The MSID, in a preferred embodiment, is a dual mode master/slave device that includes an enclosure to securely retain an ECD, and perhaps a plug which electrically couples to the ECD. Alternatively the ECD may operate remotely via a wireless connection to the MSID. The MSID unit includes a multi-level power converter to provide, from an external power source such as a vehicle battery for example, appropriate line voltages to the ECD and, optionally, the EODs. The MSID also includes analog to digital converters (ADCs) and digital to analog converters (DACs) as necessary to enable the MSID to communicate with analog EODs. The MSID further includes wireless communication means such as Bluetooth and Wi-Fi in order to wirelessly couple with external sensors and the ECD, if it is so equipped.

The MSID housing in selected embodiments includes a recess with multiple contoured regions or adjustable/interchangeable mounts to matably and releasably receive an ECD such as a smart phone or tablet device. The housing optionally includes means to insulate the ECD from water, vibration, or weather. The MSID also includes a transceiver to receive user commands from a wireless remote control and transmit the commands to the ECD. Such commands may include user inputs to control various applications running on the ECD such as music players, lake mappers, fish finders/Sonar, navigation systems, and the like. The MSID housing may also communicate with an emergency rescue beacon (ERB) (or perhaps a built-in ERB) which automatically generates distress signals in appropriate circumstances based on a command provided from the ECD or MSID.

The system may further include a redundant communication subsystem that takes the form of a Wi-Fi hotspot, a cellular modem with an alternative wireless carrier, a GPS system, and/or a satellite internet connection. This redundant communication system can provide connectivity when a communication means built into the ECD is unable to connect to the network.

In either mode (MSID Master or MSID Slave), the MSID optionally also allow the EDDs to remotely request and display all, or a subset of available data. The MSID will read the requests from each EDD that is present, and send to that EDD, the particular data it requested. In this way, the EDDs can independently display user requested data. This is a capability that may be particularly useful in a watercraft application.

In order for the MSID to accomplish the intended operations, the following set of basic MSID system capabilities pertain. Many of these can be optional depending upon the specific embodiment.

In the absence of an ECD, the MSID system may display available EOD data as selected by the MSID GUI. The MSID may also output commands, as appropriate, to selected EODs. These commands will be selected by the user via the GUI, and will include status requests, data requests, and other EOD specific commands. This will allow the MSID to act as a master control and display device in a standalone capacity (i.e., in the absence of an ECD). In order to accomplish this, the MSID system will accept and perhaps store inputs from the various EOD, which may have a Bluetooth, Wi-Fi (or any other wireless link as needed), or hardwired capability as appropriate. A hardwired capability may be considered as optional on certain models of the MSID.

When an ECD is present, the MSID system may output to the ECD those EOD data selected by the ECD. In this way, the MSID acts as a slave, being a simple data router or pass-through function, enabling the ECD to operate as the master control device for the MSID system and the peripheral EODs. If the ECD is not connected directly to the MSID, the MSID data may be output wirelessly to the ECD via Bluetooth, Wi-Fi, or other pertinent wireless links. Otherwise, the MSDI shall output data over the hardwire connection. In order to satisfy this requirement, the MSID will need to accept and perhaps store data from the EODs and the ECD via Bluetooth, Wi-Fi, or any other wireless link that may be necessary. The MSID will also accept data from the ECD if it is connected to its docking cradle.

The MSID may supply a standard iPhone/iPad interface cable, including power, to enable such devices to be cradled into the MSID. This will allow these ECD devices to be mechanically plugged into the MSID, communicate with it, and supply power to it. The MSID may also provide a mechanical receptacle which is compatible with the more popular smart devices that may act as an ECD. In this way, the ECD can be literally plugged into the MSID, which can provide mechanical stability and some degree of environmental protection to the ECD.

The MSID may also supply power to the EODs, EDDs, as well as ECD as necessary. This could be optional depending upon the implementation.

The MSID may have the option to display any data/information while in the MSID Slave state. This data could simply repeat the data being displayed by the ECD, or include health or status data for example.

If the MSID has its own built-in display capability, the brightness of this may only need to be the same or brighter than the iPad for example. An option to control the brightness of the display either manually or via automatic brightness control could be provided.

The MSID may be provided with audible outputs as necessary, and depending upon the implementation. Warnings, like an EOD is offline, possibly indicating it has malfunctioned, or its power source died, are some of the options for an audible output. Other operational data could also be output in an audible manner. These data could include depth alarms, indicating that a certain preset depth is reached, or a shallow water warning. An option to include different audible outputs for different types of warning may also be included. External speakers may be added for this capability, in addition to accommodating music/video playback operations.

The MSID may also have the capability to report/display system health status. This would be an option that could be included on certain embodiments of the system. A built-in emergency rescue beacon could also be an option depending upon the implementation (i.e., the specific model of the MSID).

Environmental conditions under which the MSID must operate could vary depending upon the specific embodiment. The iPhone operating environment, for example, is given below:

Operating temperature: 32° to 95° F. (0° to 35° C.)
Nonoperating temperature: −4° to 113° F. (−20° to 45° C.)
Relative humidity: 5% to 95% noncondensing
Maximum operating altitude: 10,000 feet (3000 m)

The interfaces between the MSID and the EODs, EDDs, and ECDs, could be optional and can range from a hardwire (such as a USB cable), Bluetooth, Wi-Fi, and/or any other wireless protocol. In the case of a hardwire interface, power could also be provided as an option.

The MSID may also contain the option for a backup internal power capability, in case there is a malfunction or interruption in the primary power supply. The amount of time the internal battery backup system lasts would be optional and dependent upon the specific embodiment/s.

The MSID will also act as a data router, sending specifically requested display data to the EDDs. Each of the EDDs will request specific data from the MSID. The MSID in turn will read the requests from each EDD, and then send those specific data to that EDD. In this way, any number of EDDs may be present, and each will be able to independently request and display specific data available from the MSID.

System Architecture

Figure 2:
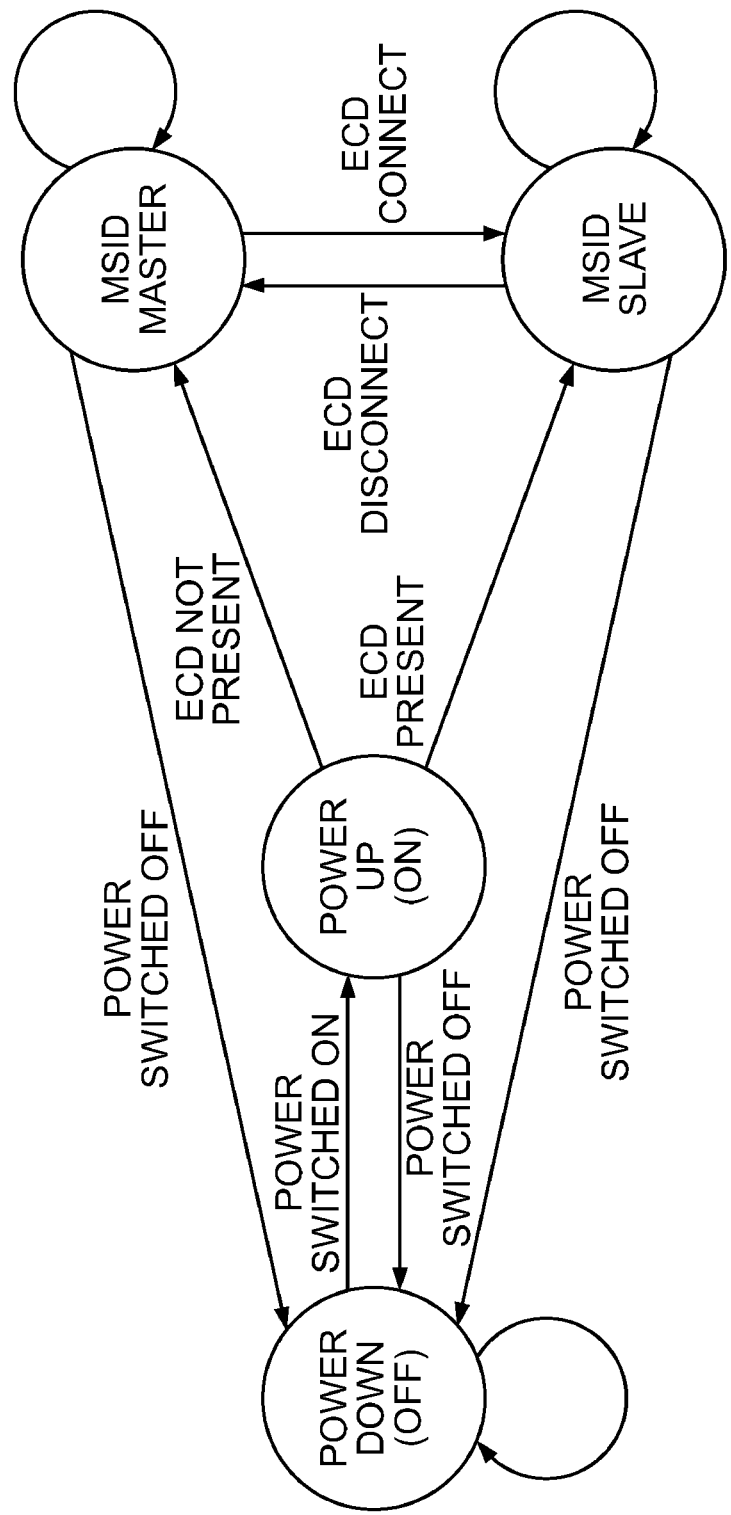
FIG. 2 is a state transition diagram for an illustrative MSID embodiment.

The MSID will operate in any of several states as shown in FIG. 2. This also shows the transition between the states of the MSID along with the transition-enabling event.

The states shown in FIG. 2 are described below:

Power Down (OFF)—The state in which the MSID has no power applied, and no operations are being executed. In this mode, the EODs may or may not be operating autonomously. The only way to transition out of this mode is to power up the system, which can be done by either by connecting power, and/or turning on a power switch. The power down (OFF) state can be transitioned to from any other state by disconnecting power, and/or turning off a power switch.

Power Up (ON)—This is a transitional state in which the MSID has been powered up from the Power Down (OFF) state. This can be accomplished by connecting power and/or turning on a power switch. Since this state is transitional, the system will not stay in this state long, as it will transition either to the MSID Master, or MSID Slave states. It is also possible to transition from this state to the power off state should power be disconnected before the other transitions occur. Other functions which may be performed while in this state include polling of the EODs and local Wi-Fi networks that are within communication range. This would be done to determine what devices are available, and what data might be displayed by the MSID, especially if it ended up in the MSID Master state. This polling could also be used to determine if an ECD is present. In addition, system performance monitoring could be executed to determine the health of the system and its various components.

MSID Master—In this state, the MSID will act as the master. As a master controller, the MSID will have control over the EODs, and control over which EOD data is displayed by the MSID. The MSID will transition into this state in two ways: Upon power up, and no ECD is detected, or while in the MSID Slave mode the ECD is not detected. This would occur for example if the ECD becomes disconnected or runs out of power. In this state, the MSID will maintain control over which EOD data is selected for display onto the MSID built-in display function. A GUI will serve as the control interface between the MSID and user. This can be accomplished via a FOG display (touch screen), or mechanical switches, or a combination of both.

MSID Slave—In this state, the MSID will act as the slave, serving as a mere data router or data pass-through to and from the EODs to the ECD as commanded by the ECD. The MSID will transition into this state in two ways: Upon power up and an ECD is detected, or when in the MSID Master state, an ECD is detected. This allows the ECD to act as the master control and display device for the system. There is an option here to also allow the MSID display to display the same EOD data as the ECD, and/or any number of other data (i.e. status, system health information, etc.).

Note that in either of the MSID Master or MSID Slave state, the EDDs, if present, will be able to independently request and display available data from the MSID.

Figure 3:
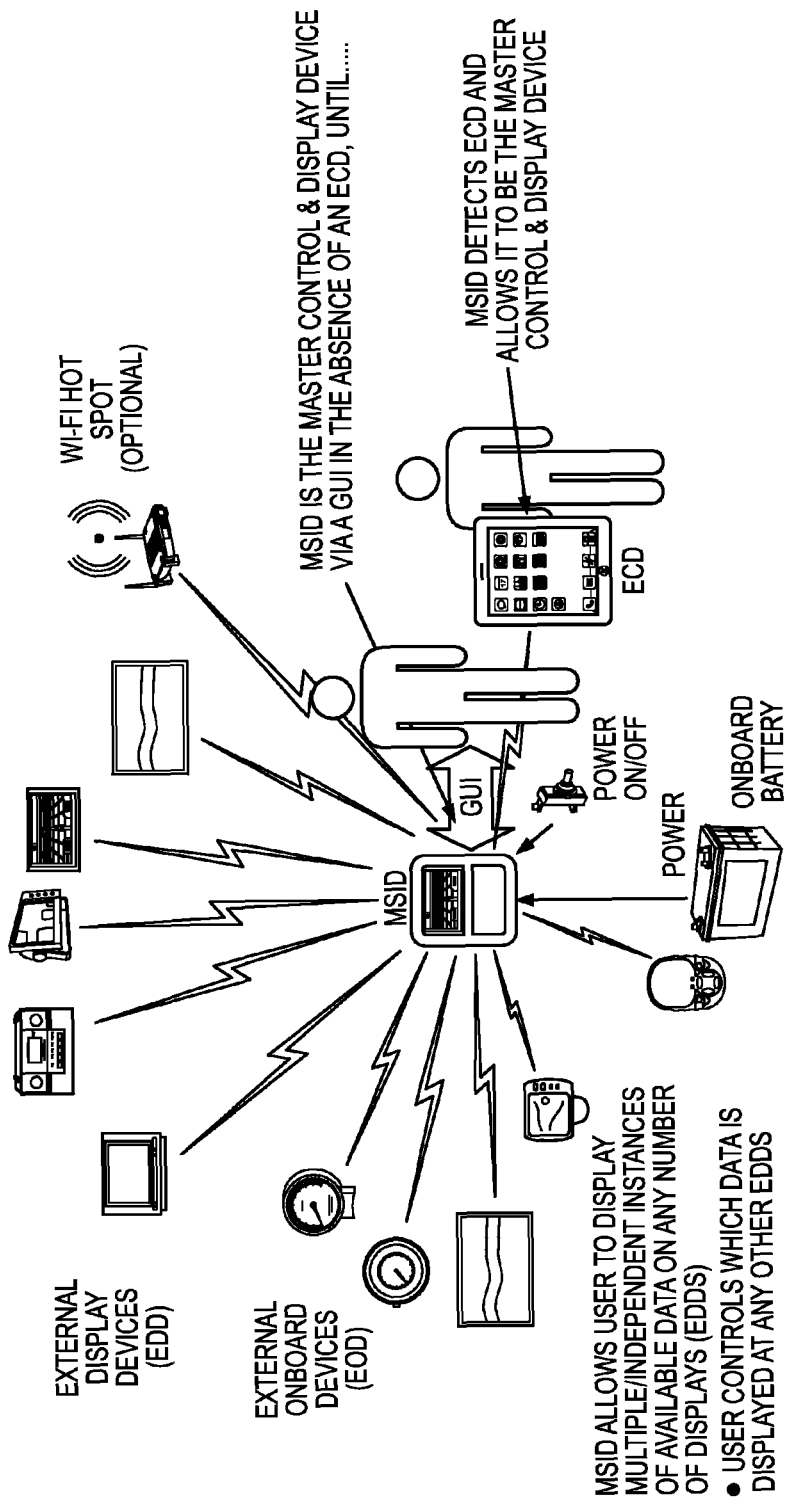
FIG. 3 is an illustration of the basic functionality of an illustrative MSID embodiment.

The operational concept of the MSID is designed to be very simple from a user's standpoint. The MSID provides an inexpensive human-machine interface (HMI) to the plurality of EODs and/or EDDs that might be present on a vehicle such as a watercraft or automobile. Inexpensive in the sense that not only the MSID itself will be cost effective, but the ECD will already be affordable, and probably already purchased by the user. The MSID will allow the user to use his/her ECD as the master control and display device, which will be complete with its own wireless connections, memory, processors, and user-oriented applications. FIG. 3 is a diagram illustrating the operational concept of the MSID system.

The MSID will operate from the onboard battery power supply. An On/Off switch can be provided to conveniently power up or power down the MSID. An optional built-in battery or the ability to use the battery of the ECD may also be provided as options in the event the vehicular power source fails.

The MSID will interface and accept data from or transmit data to, the plurality of EODs and/or EDDs that are present and operational. The data links between the EODs, EDDs, and the MSID can be either Bluetooth, Wi-Fi, and/or possibly hardwire (such as an RS232 connection).

Figure 4:
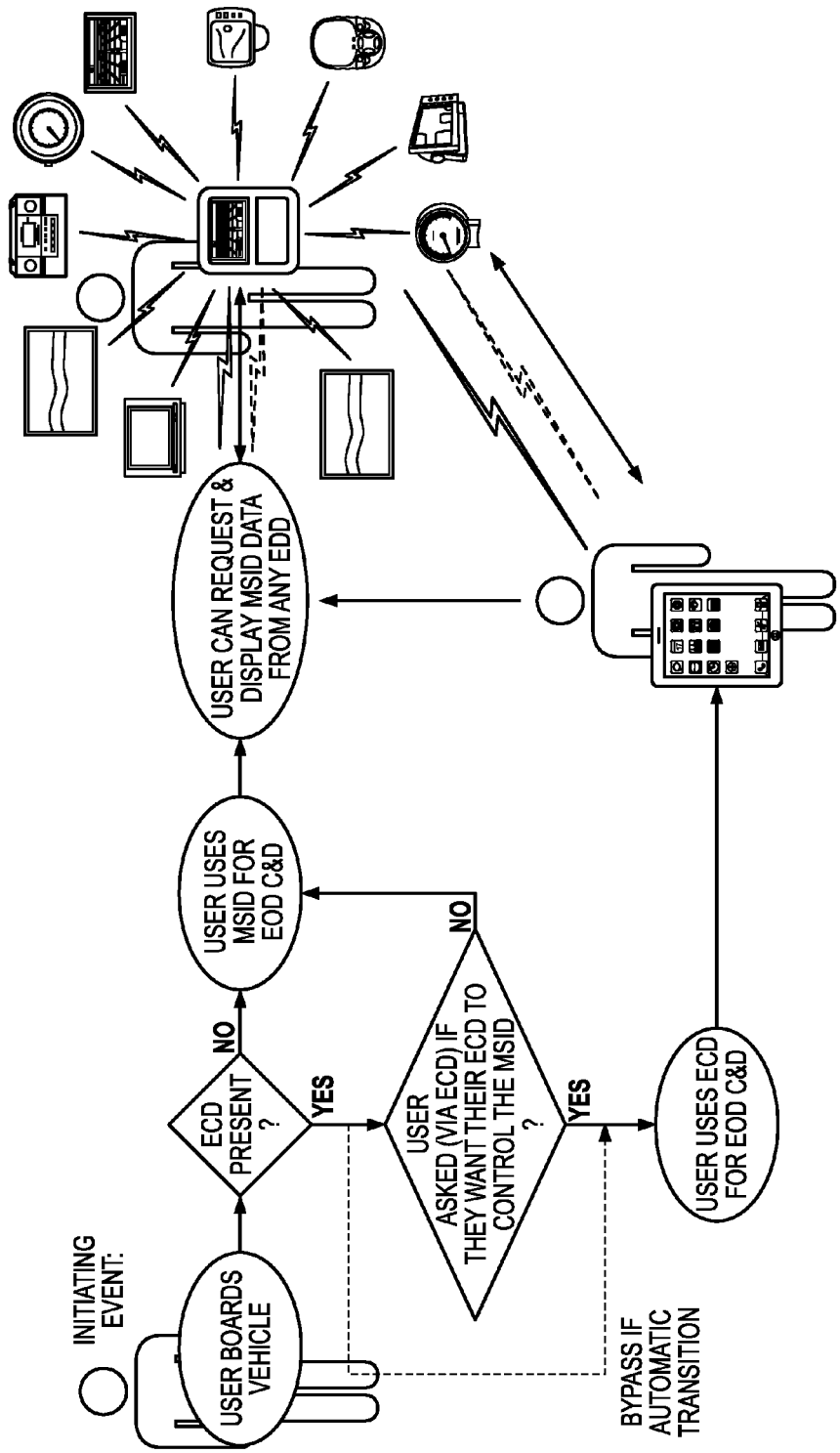
FIG. 4 is an illustration of the basic functionality of an illustrative MSID embodiment from a user perspective.

The operational concept is simple relative to the user in that the user merely boards the vehicle with or without an ECD. As shown in FIG. 4, once the user boards the vehicle and an ECD is not brought on board, the MSID will not detect it, and will continue operating in whatever state it is in. The user simply uses the MSID directly to control and display EOD data (i.e., the MSID is the master C&D).

If the user does have an ECD, the MSID will detect it (assuming it is powered on), and may provide the user the option to make it the master. The user acknowledges this, and proceeds to use their ECD as the control and display for the ECD data (i.e., the MSID is the slave). If the user decides not to use the ECD as the master, then the MSID will continue to act as master. This can be made automatic if desired, in the sense that if an appropriate ECD is detected, the MSID automatically transitions into the slave state, giving master control over to the ECD. In either case, the user interaction is keep to a minimum.

The MSID will also enable relatively inexpensive EDDs to be used for data display, rather than the more expensive all-in-one, stand alone Display/Sonar/GPS/Chart Plotter devices that are already available and commonly used (see Appendix A). The MSID does this by reading the requests from each EDD present, and then sending the requested data to the EDD that requested the data. The MSID will have this capability in either the Master or Slave state. This is shown in FIG. 4.

The generic embodiment of the MSID system is decomposed into the following subsystems:
1. Platform Subsystem (PFSS)
2. Transceiver Subsystem (TRSS)
3. Control & Display Subsystem (CDSS)
4. Digital Processing Subsystem (DPSS)
5. Clock Distribution Subsystem (CLSS)
6. Power Distribution Subsystem (PDSS)

Figure 5:
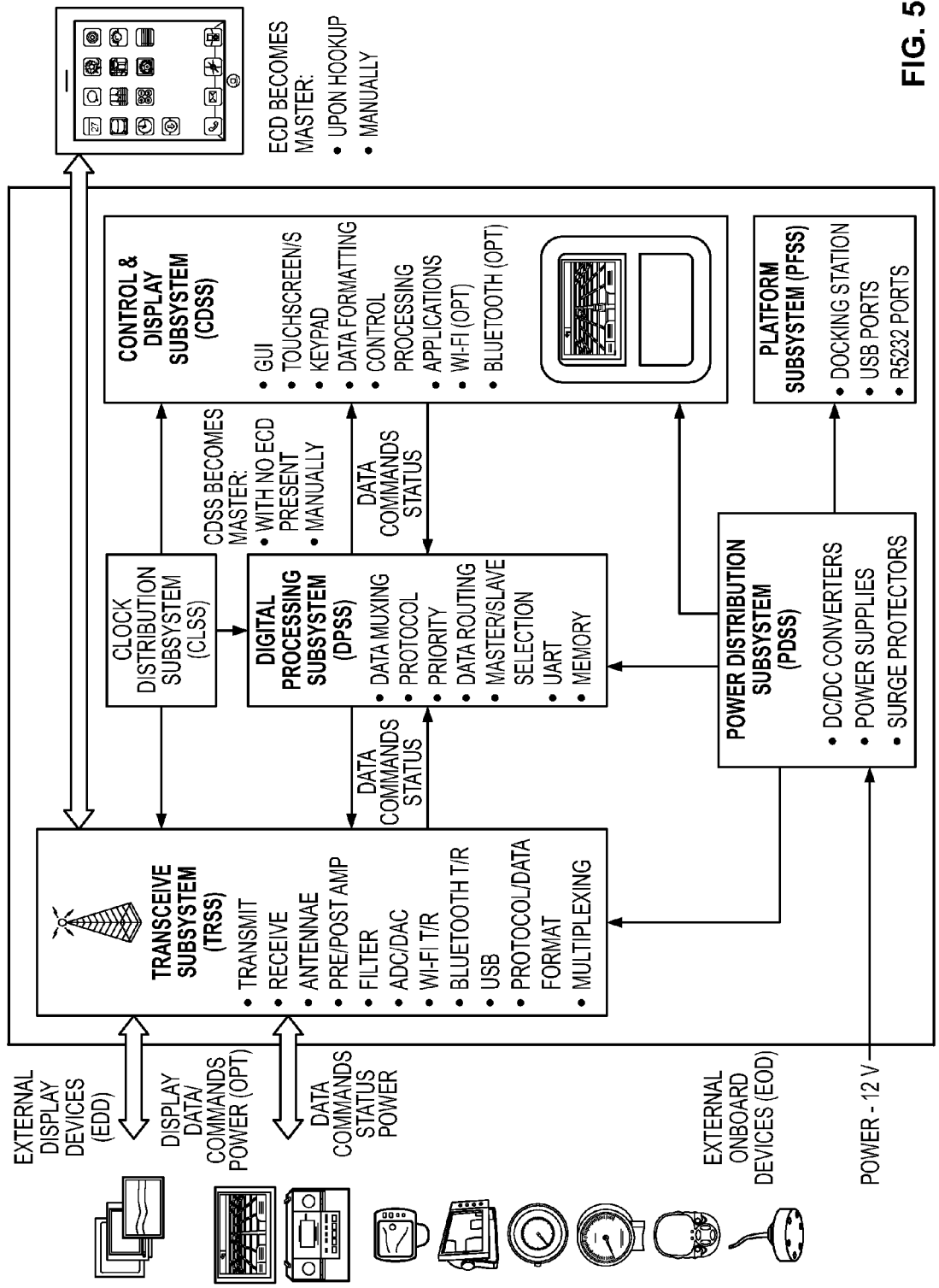
FIG. 5 is a subsystem block diagram for an illustrative MSID embodiment.

A block diagram of these subsystems is shown in FIG. 5, followed by a description of each.

Platform Subsystem (PFSS)

The PFSS is the primary mechanical interface between the EODs, EDDs, and the ECD. It therefore contains any hardwired interfaces such as an RS232 interface with the EODs, EDDs, or ECD if necessary. This may be necessary if the option to provide power to the external devices is invoked. The PFSS provides the structure which houses all of the other subsystems, including a docking cradle for the ECD. It may also contain a display of its own (part of the CDSS) to act as a master control & display when in the MSID Master state.

Transceiver Subsystem (TRSS)

The TRSS provides all the communication between the MSID and the EODs, EDDs, and any ECD that may be present. As such, it contains Bluetooth, Wi-Fi, and any hardwired interfaces that may be necessary. It will also provide the ADCs necessary to convert the incoming analog signals to digital for processing by the DPSS. It will subsequently also contain any DACs necessary to convert and digital signals to analog for transmission. Most of these conversions however will take place within the Bluetooth and/or Wi-Fi transceivers which will probably be contained within the TRSS.

Since Wi-Fi is primarily used for connecting wirelessly to the internet, and Bluetooth is primarily a shorter range wireless interface to remote, but nearby devices, it is anticipated that Bluetooth will primarily be used for these EODs and/or properly equipped EDDs, as well as interfacing to the ECD, whereas Wi-Fi will tend to be used for any internet connections with the MSID.

The TRSS will send data to, and receive data from the DPSS. Properly formatted EOD and/or EDD data will be transmitted to the DPSS, possibly along with EOD status. In return, the TRSS will receive commands from the DPSS to be transmitted to the EOD. Such signals may include a beacon command for example.

The TRSS may also receive a clock from the CDSS if necessary. Since most wireless communication protocols are asynchronous, it is not anticipated that this interface will be necessary, but it included for completeness.

Control & Display Subsystem (CDSS)

The CDSS is the primary interface between the MSID and the user when in the MSID Master state. In order to keep costs down, the capability of this standalone mode may not be as sophisticated as a modern ECD such as an iPad, but it will contain the basic capability to control and display the EOD and EDD data. One embodiment could be a touch screen, similar to those found on many ECDs or EDDs. The control could be via FOG commands on this display.

Figure 6:
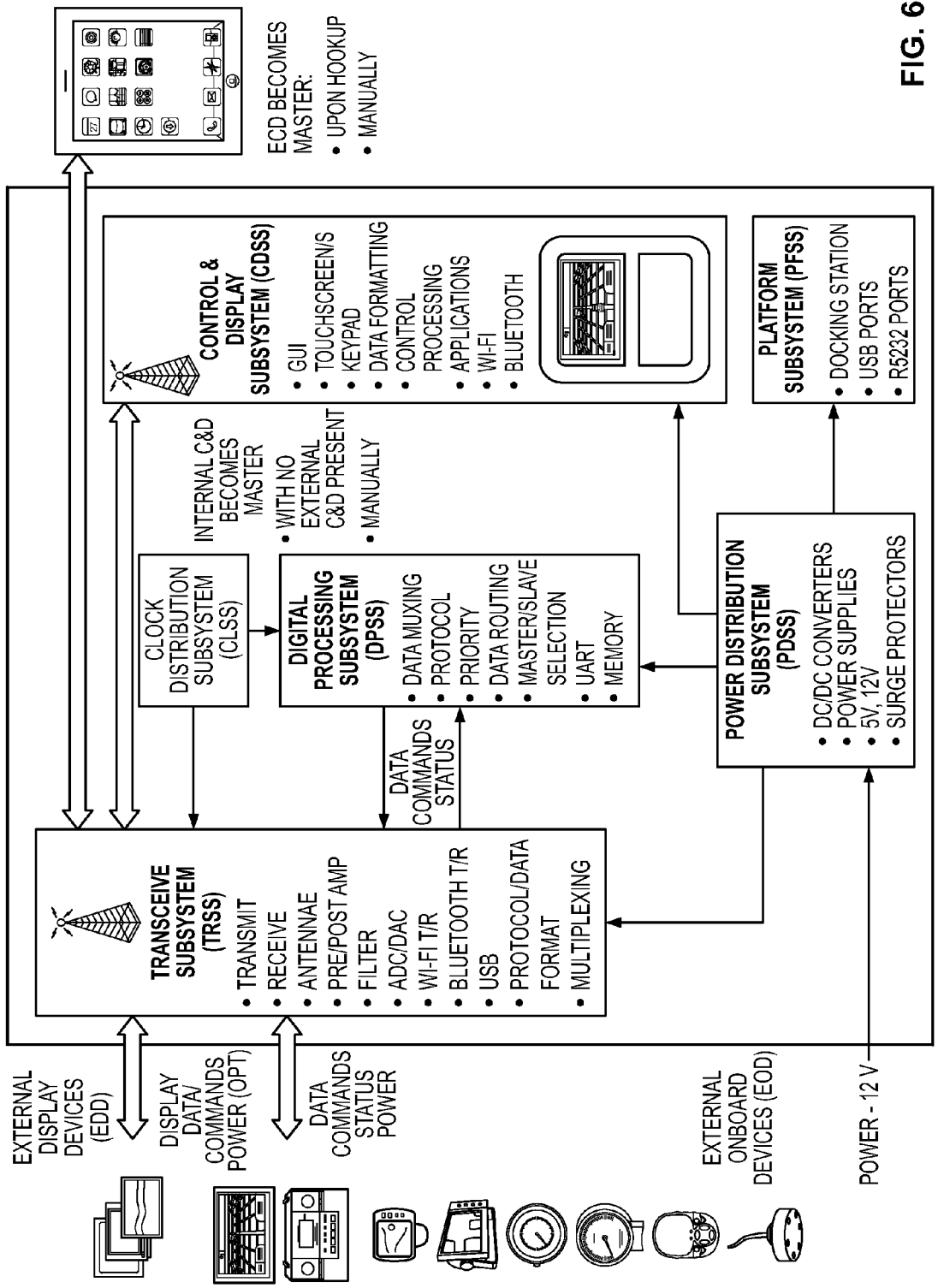
FIG. 6 is another subsystem block diagram for an illustrative MSID embodiment.

The CDSS will receive EOD/EDD data from the DPSS. This could already be formatted for display, or if not, the CDSS would perform any formatting that may be required. This interface may be implemented by hardwiring to the DPSS. Another option shown in FIG. 6, would be to transmit the EOD/EDD data directly from the TRSS via wireless link, such as a Bluetooth or Wi-Fi. In the latter case, a Bluetooth or Wi-Fi capability will be a necessary component in the CDSS.

Figure 7:
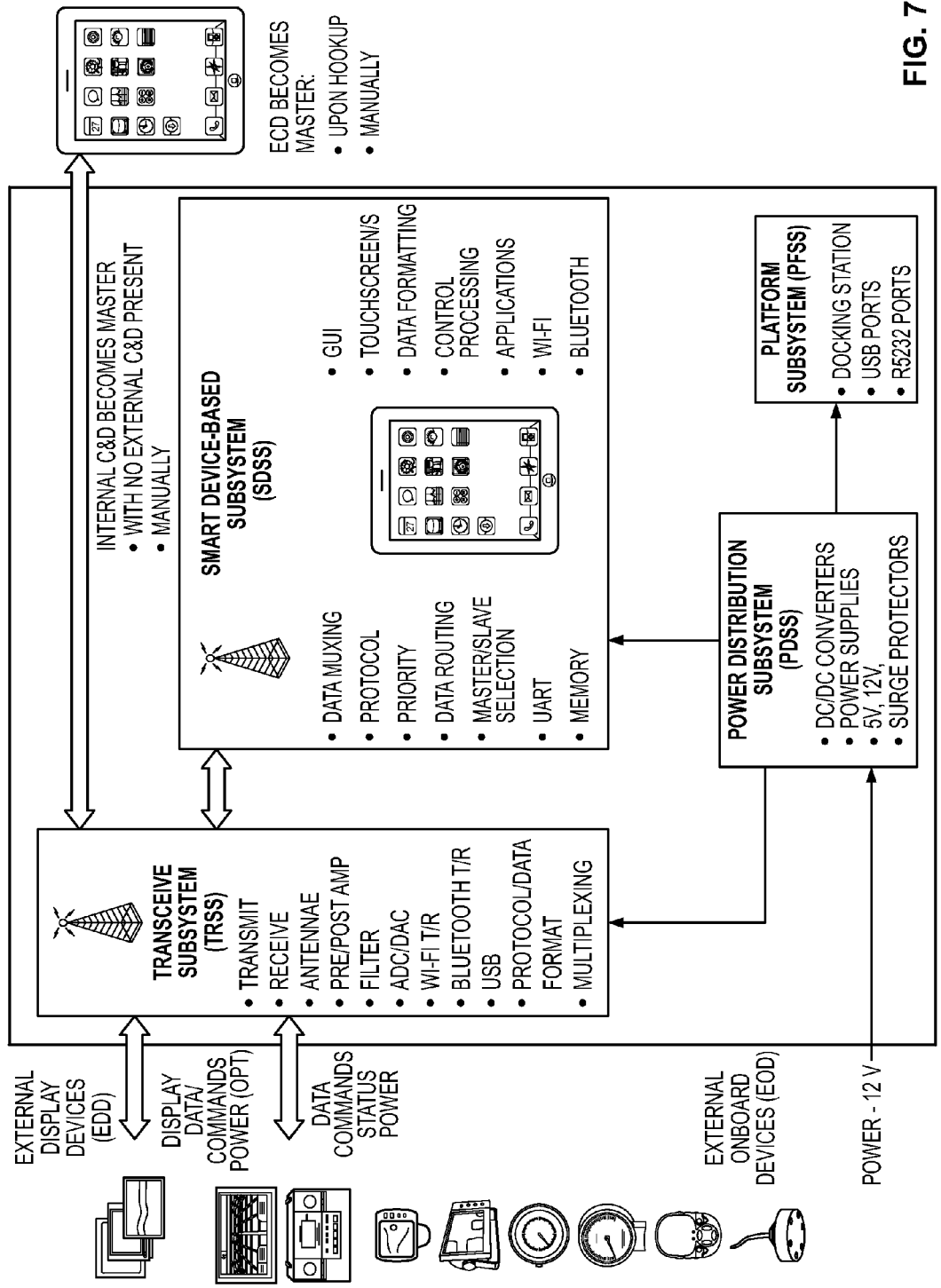
FIG. 7 is yet another subsystem block diagram for an illustrative MSID embodiment.

Note that a possible implementation of the DPSS could be an already available device such as an iPad or iPhone. These devices already have Wi-Fi, Bluetooth, Hardwire communication capability imbedded in them, in addition to digital processors and user-oriented applications. It is possible that this could act as the CDSS, CLSS and DPSS. This would be accomplished by communicating with the TRSS directly via a wireless link. FIG. 7 shows this optional implementation.

Digital Processing Subsystem (DPSS)

The DPSS provides the processing necessary for the detection and decision logic that will determine if the MSID transitions into the Master or Slave state upon power up. These decisions are illustrated in the processing flow diagram of FIG. 9. In order to make these decisions, the DPSS interfaces with both the TRSS and CDSS. In the slave state, the DPSS serves mainly as a data router or data pass-through function, transferring data to and from the TRSS as commanded by the ECD and/or EDDs.

When in the MSID master state, the DPSS receives commands from the CDSS and passes them to the TRSS. The EODs will receive these commands, and send back the requested data to the TRSS. The DPSS will pass the received data from the TRSS to the CDSS for subsequent display.

In either state, the MSID will also accept display data requests from each EDD present, and route the requested data, if available, to the appropriate EDD.

Clock Distribution Subsystem (CLSS)

In the primary embodiment, dedicated general purpose computer chips will probably be used to implement the DPSS. As such, it may need a clock which is external to it. If this is necessary, the CLSS generates whatever clocks may be needed by the DPSS, or any other subsystem, and distributes them as necessary. Although most point-to-point communications, especially wireless, are asynchronous and may not need externally generated clocks at all, the CLSS is included for completeness.

Power Distribution Subsystem (PDSS)

The PDSS assumes as its primary source of power, an external source such as a vehicular 12 v battery. It will then provide the necessary power conversion, most likely DC to DC in nature, to the various other subsystem components, as well as possibly the EODs, EDDs, and/or ECDs. Typical devices in applications such as this could require voltages of 5 v for devices like the iPhone, iPad, and iPod for example. Other voltages will be generated as required by the specific embodiments.

Interfaces

Figure 8:
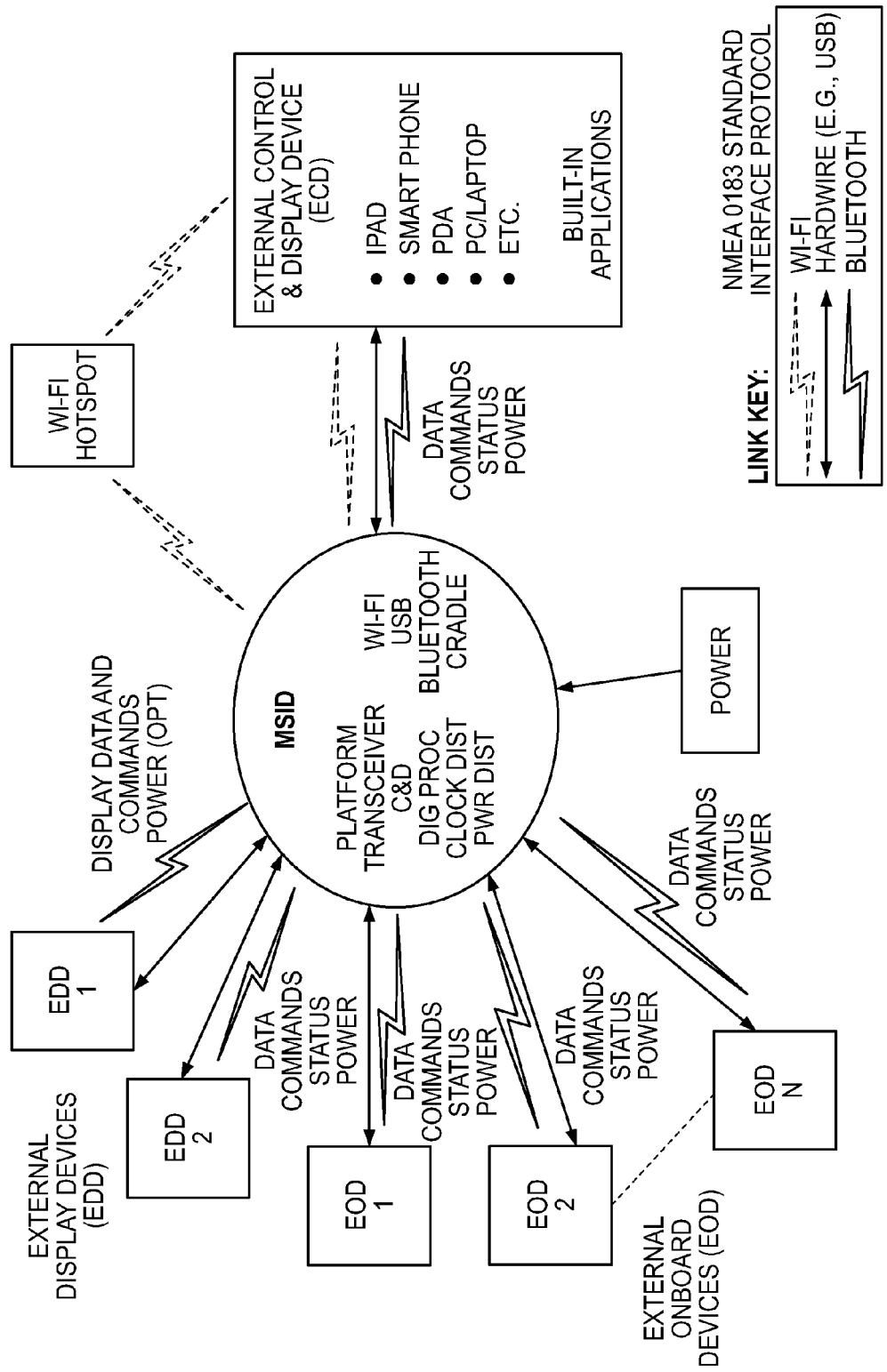
FIG. 8 is an interface diagram for an illustrative MSID embodiment.

Interfaces to the MSIP are shown in FIG. 8, and include wireless links, like Bluetooth and Wi-Fi, as well as hardwire links (as necessary). The hardwired interfaces may be optional, and not provided on some models of the MSID. In all probability, the EODs and EDDs will be in close proximity to the MSID. Since Bluetooth wireless communications are inherently short range, it is this wireless link that will primarily be used between the MSID and EODs as well as appropriately configured EDDs. Bluetooth will also be one of the means to communicate with the ECD as well. This is shown in the figure. The ECD may also contain a Wi-Fi transceiver, so this type of link could also be used for MSID-ECD communications, as well as a hardwire link. To link with a Wi-Fi hot spot for internet connectivity, Wi-Fi may be utilized exclusively. A common protocol for wireless links is the NMEA 0183 Standard. The NMEA 0183 Standard defines an electrical interface and data protocol for communications between marine instrumentation, so this could be the primary protocol used for the MSID. Other protocols exist, and will be used depending upon the specific implementation of the MSID.

Processing Flow Diagrams

Figure 9:
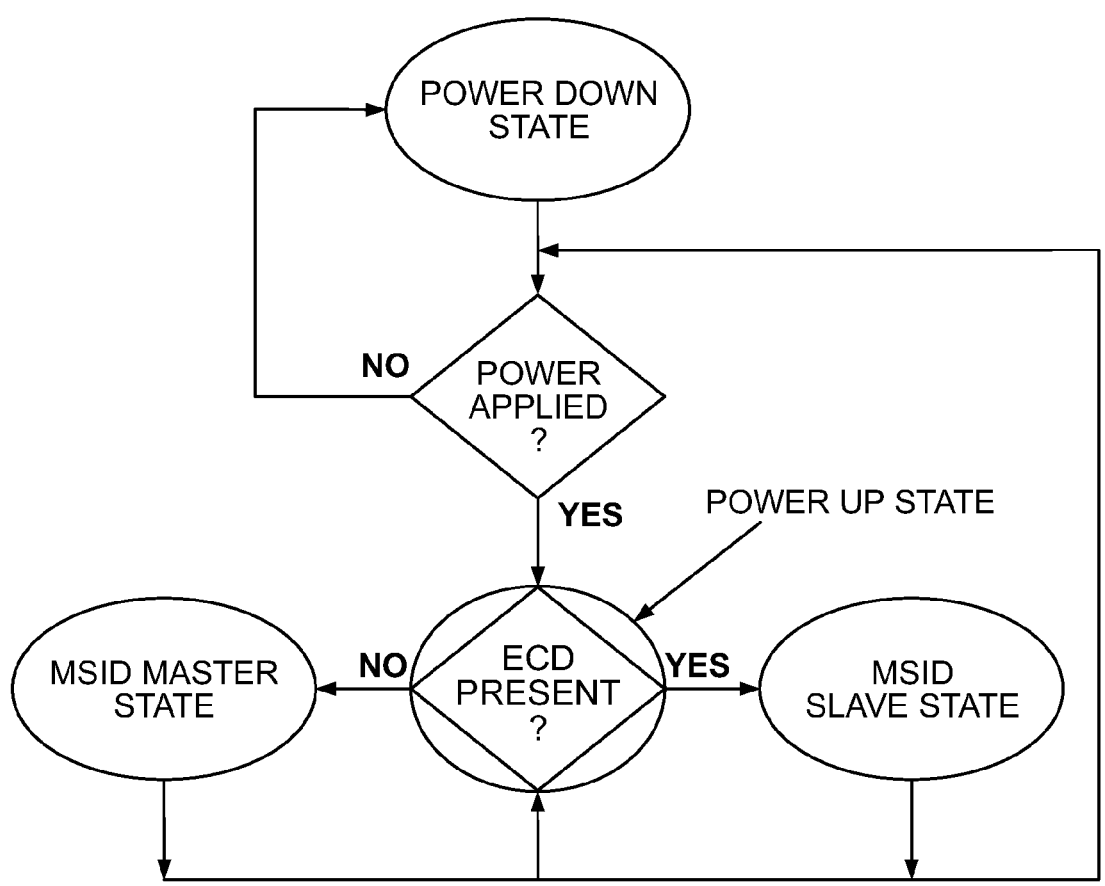
FIG. 9 is a process flow diagram for an illustrative MSID embodiment.

FIG. 9 depicts the basic processing flow diagram as the MSID system transitions from the Power Down (OFF) state to either the MSID Master or MSID Slave state, via the transitional Power Up (ON) state. It also demonstrates the transition from any active state to the Power Down state, mainly by removing power. The DPSS is primarily responsible for this particular decision process.

Figure 10:
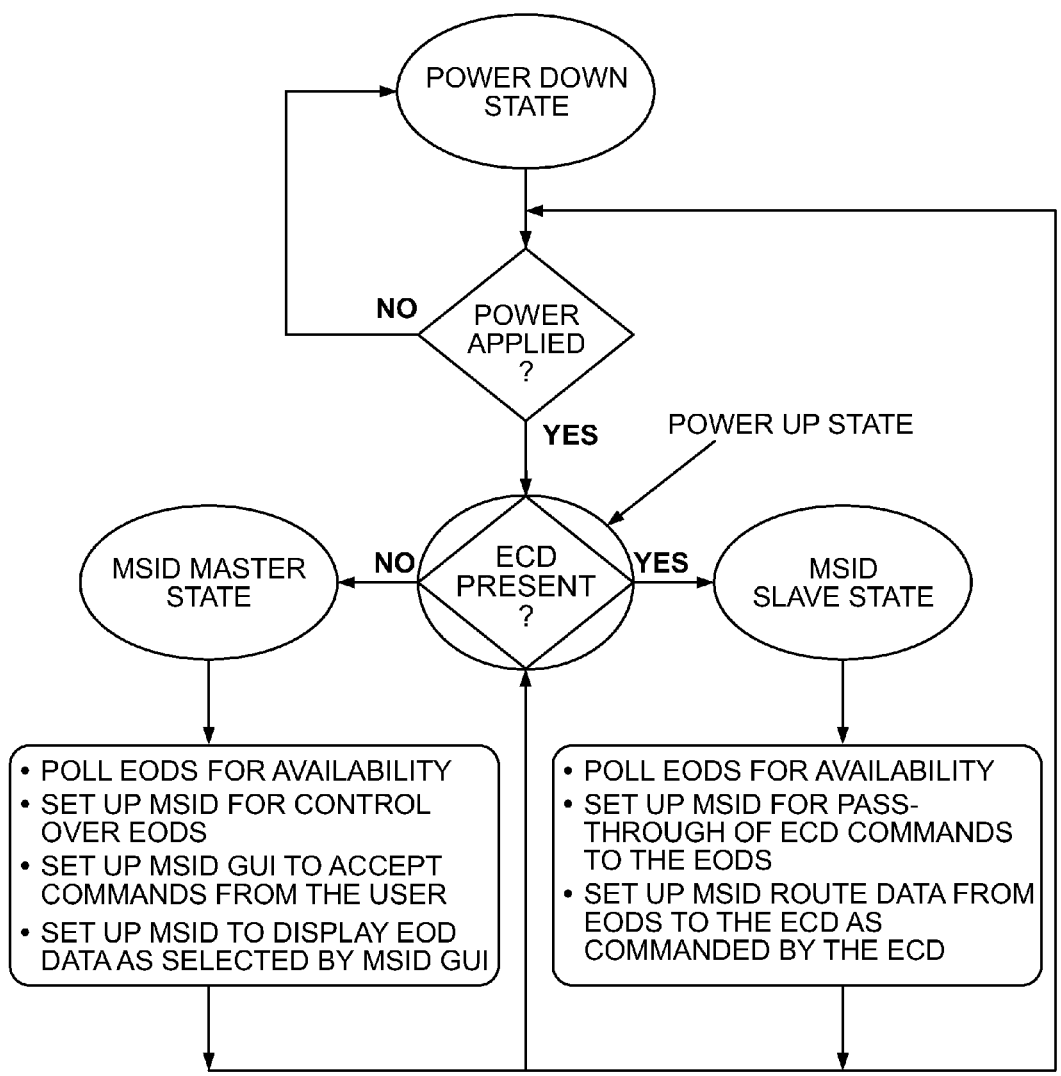
FIG. 10 is another process flow diagram for an illustrative MSID embodiment.

As with the state transition diagram (FIG. 2), this process embodies one of the essential innovative aspects of the MSID. A more detailed process is shown in FIG. 10, which simply shows more of the operations that would be involved when the MSID is in its various states. For example, in the MSID Master state, the MSID will poll the available EODs, and set itself up as the control over them. It will also set itself up to display EOD and EDD data as selected by the MSID GUI, or as selected by the individual EDDs that are present.

In the MSID Slave state, the MSID will also poll the available EODs, but in this case it will set itself up to receive ECD commands, and serve as a data router, transferring EOD data as selected by the ECD, to the ECD for display. The MSID will not itself be the source of the commands, nor will it need to display the selected EOD data. An option may be to let the MSID go ahead and also display the selected EOD data, as well as sending the data to the ECD. As with the MSID Master state, the MSID in the Slave state will continue to accept display data requested by each of the EDDs, and route those data to the appropriate EDDs.

Applications/Implementation Options

The MSID concept as described in this document represents a way to network various vehicular sensors using an inexpensive handheld smart device (ECD) as the main processing and display function. In the absence of an ECD, the MSID will act as the master control and display unit. If remote EDDs are present, the MSID will enable each to act as an independent unit, requesting and displaying specific, user requested MSID data.

There are several applications of this concept which will use various combinations of EODs and EDDs, and these are summarized in the table in FIG. 11 along with potential links between the MSID and the peripheral devices. The table includes a color coded probability that a specific peripheral and associated link could be used for various applications. Also indicated are peripherals that could be built-in to the MSID as an option. The various combinations of the peripherals and applications provide a myriad of implementation or design options for the MSID. Almost any combination of such could be considered a specific implementation, with each geared towards a specific application.

EODs other than those mentioned to this point could also be a part of the MSID system. For example, if the MSID were to be used in a dwelling such as a Home, Camp, or Office Building, a motion sensor may be included as an EOD for security monitoring.

The table by no means attempts to constrain the number and types of EODs, or EDDs that could be employed with the MSID concept described herein. Other devices not mentioned here could be used, and will add to the design options and utility of the MSID.

As examples of other vehicular contexts to which these principles may be applied, MSID-based systems may be deployed in trains, ferries and airplanes. Such systems may be designed to provide passengers information and entertainment through their tablet computers while also charging the tablet device. Advertising and promotional offers can of course be transmitted through the MSID to each passenger's tablet device. An MSID interface may be disposed at each seating location.

The MSID represents an inexpensive approach to the control and integration of a network of peripheral vehicular-related devices. Primarily it will enable an external smart device (i.e., iPhone, iPad, PC, etc.) to act as a master control and display for the entire device network. In this way, the relatively inexpensive smart device can be used as a powerful master controller. It will have contained within it the memory, processing power, display capabilities, and user-oriented applications which will provide considerable flexibility in what and how various device data and information is displayed and/or used. It will also allow for inexpensive remote display devices to be used for independent data requests and display. For maritime applications, these data could take the form of fishing maps, water depth contour maps, weather conditions, water temperature, and more. This will require little investment on the part of the user, and will obviate the more expensive all-in-one, stand alone Display/Sonar/GPS/Chart Plotter devices currently in use.

In the absence of an external smart device, the MSID can and will act as its own master controller, providing in selected embodiments only basic control and display capability. The MSID will be able to transition to either state automatically by detecting the presence or absence of the external smart device. This will allow a backup control and display mode in case the user forgets to bring his/her handheld device, or if the handheld device malfunctions.

The MSID concept can be used on any vehicle, and is not limited to automobiles or watercraft. In fact, the MSID can also be used in a dwelling such as one's home or perhaps a camp. The MSID can be implemented in a multitude of ways, and will depend upon the specific applications and devices used. Several implementation concepts were included in this document, but all of these have in common the capabilities mentioned above.

Master/Slave Mode Functionality

Figure 12:
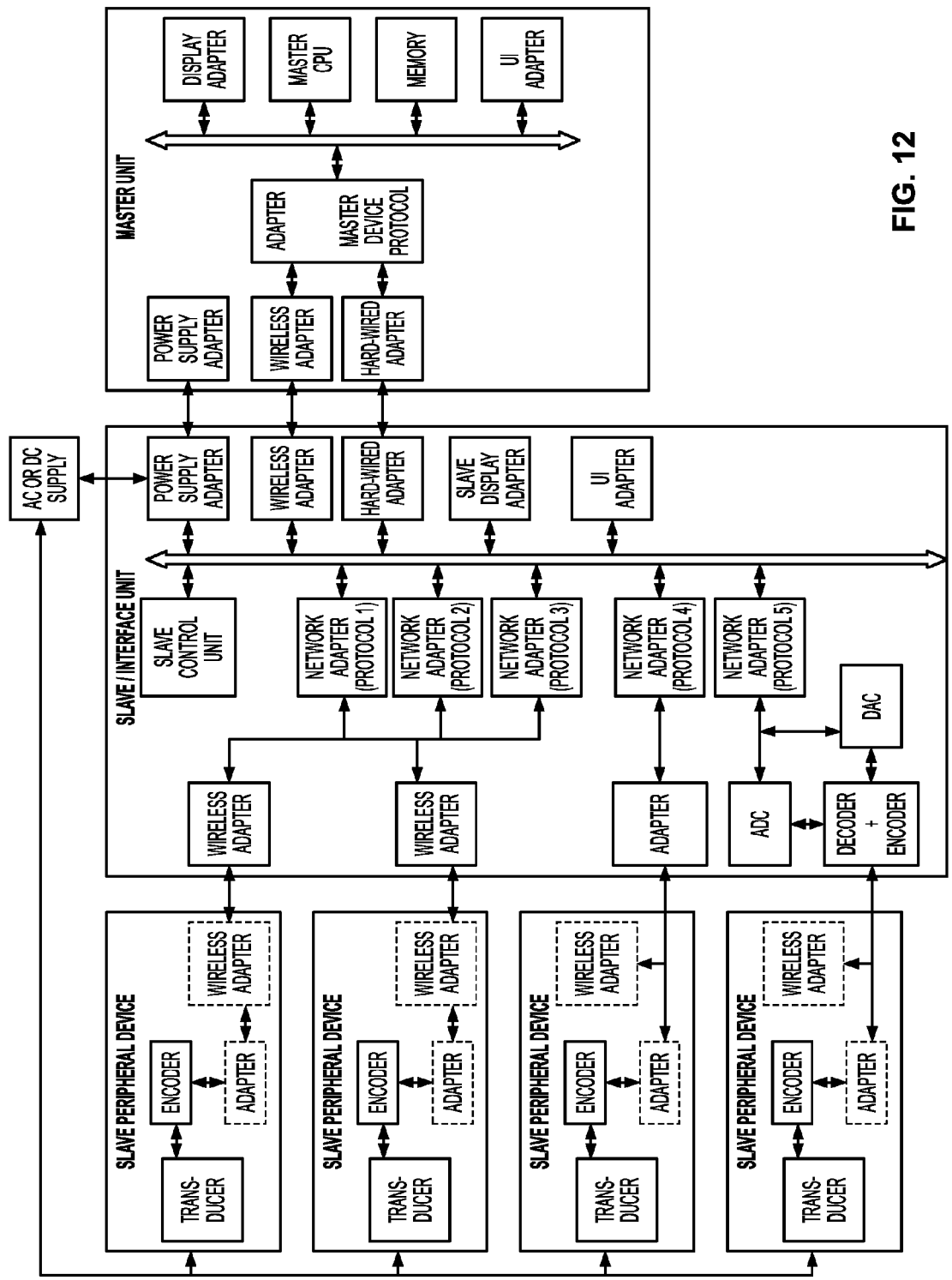
FIG. 12 is a schematic of a hardware-centric system architecture.

A hardware-centric implementation is illustrated in FIG. 12. It will be understood that the functions of the controllers and adapters may optionally be performed in software, either within the operating system, drivers or in the application layer. It will also be understood that the architecture of FIG. 12 can be arbitrarily expanded by inclusion of more peripherals, controllers, adapters, converters, control units, processors, buses, encoders, decoders, etc. and that the functionality of an arbitrary fraction of those additional components can likewise be deployed in software executed by a general purpose microprocessor. The items in dashed boxes are optional in the depicted embodiment.

With reference to FIG. 12, a master unit (e.g. handheld device) interfaces with a slave/interface unit (e.g. an MSID) which in turn interfaces with a slave peripheral device (e.g. vehicular subsystem controllers, sensors, transducers). The slave/interface unit includes various network protocol adapters which are configured to communicate unidirectionally or bidirectionally with the peripheral devices. The slave control unit (processor) arbitrates the communication between the network protocol adapters and the handheld device adapters. The master unit bus operates on a master device protocol and communicates according to that protocol with the adapters which are interfaced with the slave/interface unit.

Accordingly, the master unit communicates unidirectionally or bidirectionally with the slave peripheral devices directly or pseudo-directly in the sense that the slave/interface control unit is in one embodiment merely arbitrating the transmission of data through the slave/interface unit. In other embodiments the slave control unit or an operating system or application program running thereon serves as a peripheral with a ported connection to the operating system of the master unit and thereby serves as a translator or intermediary between the master unit and the slave peripheral devices. In preferred embodiments the functionality of the slave control unit is minimized in order to permit the use of inexpensive processors and memory. In such embodiments the slave control unit does not execute processor overhead intensive or memory-access-intensive tasks but rather arbitrates the communications with the master controller.

In certain embodiments the slave control unit retains control of certain interface operations with the slave peripheral devices. Fault detection, polling, clocking (if required) and related operations are performed in the background by the slave control unit. The master control unit remains the sole or primary user interface in preferred embodiments. The master unit may provide, from the user's perspective, the main control panel for all vehicular operations associated with the peripheral devices.

To this end, the master device optionally includes an application program or array of application programs which utilize data received from the various slave peripheral devices. In one embodiment, a single application program includes various modules accessible through a single user interface screen. Each module performs a different category of functions. For instance, a mapping and navigation module interfaces with the GPS or location service related peripheral devices, displays a navigation map and enables route guidance and direction services. A fishing guide program interfaces with GPS or location based peripherals, sensor peripherals (depth and water temperature) and remote servers (fishing guide advice server, weather conditions server). Entertainment modules interface with associated peripherals, such as speakers and audio input sources.

Access with remote servers in preferred embodiments is controlled by the master unit operating system. If the master unit is equipped with communication means that permit an internet or private network connection the master unit operating system arbitrates and controls the access of remote servers as required by the application programs. Alternatively, the slave control unit operating system may act as a communications peripheral by controlling a subordinate communication means included in the slave/interface unit.

In this way, the operating system and application program(s) on the master unit in a preferred embodiment act to provide the primary user interfaces and network connections relied upon to support the application level functionality. Access to remote servers to obtain directions, lake maps, software updates and downloads, subscription based services, telephony, email, messaging, streaming media and the like is managed by the master unit operating system and application programs.

Updates in such embodiments may be executed conveniently by polling and download operations managed by the master unit's operating system and application programs. Additional and new software may likewise be downloaded at any time an appropriate network connection is established by the master unit. Subscription based services may likewise by utilized (and enrolled in) when the master unit is mated to the slave/interface unit and optionally when it is not.

According to this embodiment, if the user upgrades his or her handheld computing device the functionality of the MSID system will likewise be enhanced. The software and settings from the user's previous handheld device may be ported over to the new device and new functionality may be provided by the new master unit operating system and/or new application software downloaded to the master unit.

In various embodiments a master unit application also manages the updating and installation of software on the slave/interface unit. Periodic updates and new operating system and application program versions may be downloaded by and to the master unit and then installed on the slave/interface device.

The slave/interface unit may include an arbitrary amount of the functionality of the master unit, including redundant applications to permit similar control operations when the master unit is absent. It should be understood that in many embodiments provides the substantial advantage that the slave/interface unit hardware and software will be relatively rudimentary and cost-effective because the system will be primarily intended operate in slave mode, mated to a user's handheld device. For instance, the slave/unit interface processor speed (including clock speed) may be substantially lower than that of the handheld device. Likewise, the main rapid access memory of the interface unit may have a substantially slower access speed and read/write rate than that of the handheld device. The slave/unit interface may be equipped with a relatively inexpensive hard disk drive and the handheld device may be equipped with comparatively expensive nonvolatile memory as a main storage means.

The slave/interface unit and master unit may communicate according to a client/server model, the master being the server. The master unit may likewise communicate with remote servers according to a client/server model, the master unit being the client in that communication.

The operating system on the MSID, as discussed above, is configured to enter a slave mode upon the insertion of a handheld device into a docking cradle or mating of a handheld device to the MSID. The MSID may also have various software applications which interface with one or more vehicular subsystems. These programs include depth charting software, GPS location software, lake mapping software, navigation software, trolling motor control software, messaging software, and emergency rescue beacon control software.

Housings

As described in U.S. patent application Ser. No. 61/623,222, entitled Interfacing Handheld Devices, and 61/621,495, entitled PhoneBook and TabletBook, which are incorporated herein by reference, the handheld device may be installed in a variety of housings. In one embodiment, the slave/interface unit (MSID) includes a clamshell housing to retain and protect the handheld master unit. The clamshell is optionally substantially waterproof or water resistant, at least when in the closed state. The clamshell may also include rubber mounts, springs and/or viscous mounts or dampers which substantially absorb vehicular vibration. Tactile keypads may be omitted in maritime and automotive embodiments. In such embodiments, the MSID may include essentially the upper half of the TabletBook clamshell device with an optional hinged cover (not shown) to provide water resistance.

MSID Memory Card Option

The MSID may optionally be equipped with a memory card slot and associated adapter. In this embodiment SD cards containing proprietary information such as lake maps can be inserted into the MSID and accessed by the MSID when it is in master mode and by the handheld device (through the MSID) when the MSID is in slave mode. In this manner proprietary content such as lake maps, fish guide advice, contour maps, navigational data can be purchased in the form of a card as an alternative to downloading that information through the handheld device or transceivers associated with the MSID.

The Keystone System

Figure 13:
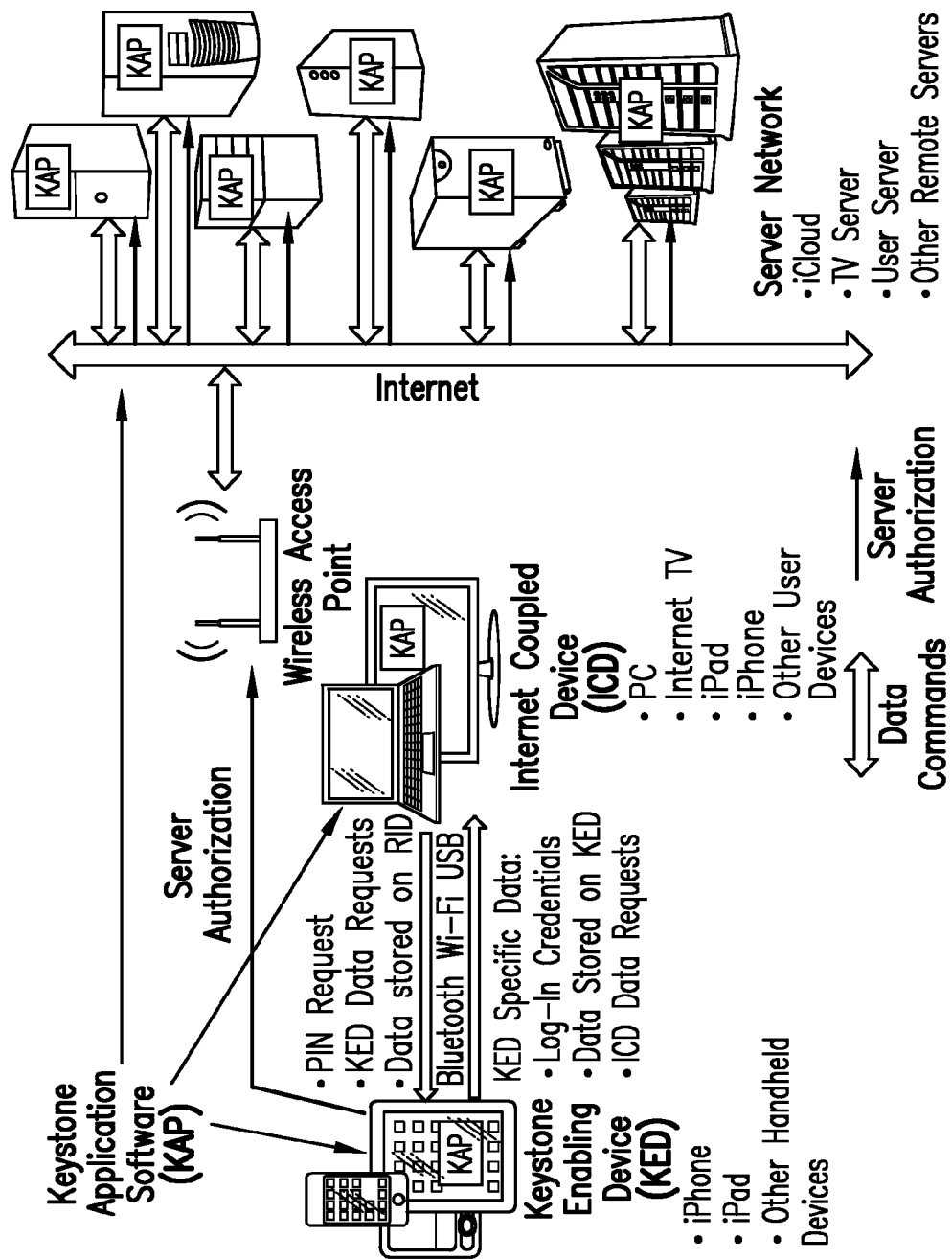
FIG. 13 is a system diagram of an illustrative Keystone embodiment.

FIG. 13 is a system diagram illustrating the intercommunication of Keystone application programs (KAPs) deployed on an array of Keystone enabling devices (KEDs), Internet coupled devices (ICDs) and remote servers. The KEDs may be smart phones or other handheld computers with comparable computing capacities and operating systems. The ICDs are in illustrative embodiments personal computers, notebook computers, laptops, internet-capable televisions, tablet computers, vehicular entertainment and control systems, Blu-Ray players, gaming consoles or other computing devices coupled to the internet. The servers provide cloud storage, streaming video (e.g. Netflix, Vudu, and Hulu), telecommunication services (e.g., Skype, Verizon or AT&T), messaging services, email services, and access to the internet.

Each KED has disposed thereon a KAP which establish sessions with the KAPs on one or more servers and one or more ICDs. In a first communication channel the KED provides a server authorization through wireless access point such as a data channel provided in a telecommunication network. In a second communication channel the KED transmits to the ICD credentials, data files stored locally on the KED and data requests. The KAP on the ICD transmits to the KED data requests, PIN requests and data stored locally on the ICD.

The ICD has disposed thereon the KAP and also a plurality of content application programs or plug-ins (CAPS) such as email programs, word processors, internet browsers, PDF viewers, streaming audio and video programs or plug-ins (e.g. Pandora, Sirius, XM Radio, Netflix, Vudu), social media programs or plug-ins (e.g., Facebook, Twitter), messaging programs, and proprietary service programs or plug-ins (e.g. Wells Fargo Mobile, Delta Mobile).

Exemplary servers include proprietary servers providing streaming music, satellite radio, streaming movies, streaming television, social media, restaurant reservation portals, banking sites, airline servers, cloud storage, corporate VPN servers, retail sites, and travel agent and reservation sites. Currently active commercial servers of this type include Pandora, XM Radio, Vudu, Hulu, Facebook, OpenTable, Wells Fargo, Delta.com, Carbonite, Dropbox, Amazon and Expedia.

Figure 14:
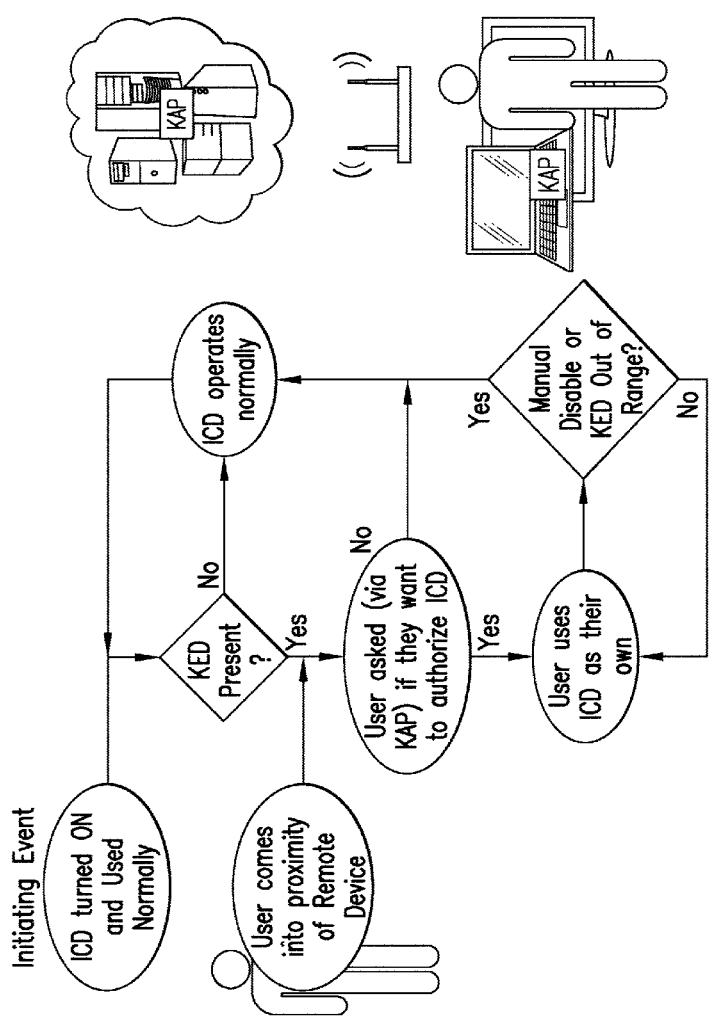
FIG. 14 is a flow diagram for an illustrative Keystone embodiment.

FIG. 14 is a flow diagram of an illustrative Keystone embodiment. An ICD is in a normal operating state. The ICD polls for KEDs, for example, via a Bluetooth, which is a wireless technology standard for exchanging data over short distances (using short-wavelength radio transmissions in the ISM band from 2400-2480 MHz) from fixed and mobile devices, creating personal area networks (PANS) with high levels of security. If a KED is detected within Bluetooth signal range and that KED has been paired to the ICD, the ICD pairs with the KED and sends an authorization request. The KED user is prompted to accept or decline the authorization request from the ICD. If the request is authorized (either automatically or upon receipt of user input) the KED transmits user credentials (such as usernames and passwords) for accessing the user's accounts on the proprietary servers to the ICD. The KED may also transmit locally stored data files such as internet bookmarks, documents, music, video and the like. Depending on the bandwidth of the KED-ICD connection, the KAP may be configured to push all desired data files upon establishment of the connection or rather to postpone transmission of certain data files pending receipt of a specific request from the ICD.

The ICD KAP receives the credentials and data files and processes them in accordance with user-specified preferences. For instance, the KAP may be configured to automatically launch certain programs, such as the email program, which in turn automatically establishes a session with a remote mail server. The KAP on the ICD may be configured to automatically write credentials into appropriate data files for stand alone programs disposed on the ICD like DropBox, Delta mobile (in the case of a mobile ICD like an iPad), Carbonite, Netflix (in the case of an ICD in the form of an internet capable television or BluRay player), or XM Radio (in the case of an ICD in the form of a vehicular infotainment system). Alternatively or additionally the KAP may include plug-ins for these others programs which interact with the main KAP or the KAP may monitor for the launch of such programs and interact with them via APIs. In this way the KAP facilitates the push of credentials to the other applications running on the ICD.

The net result is that the ICD is automatically transformed into a functional clone of the user's personal computing device. In the case of an ICD in the form of a desktop PC, the KAP software automatically populates the desktop PC with the user's documents, music and video such that the desktop PC looks and operates essentially as a clone of the user's home PC, compete with automatic DropBox folder configuration, automatic population of log-in credentials for Netflix and iTunes, and automatic population of internet browser bookmarks. In the case of an ICD in the form of a tablet PC such as an iPad, stand-alone programs such as games, on-line banking programs (e.g., Wells Fargo Mobile), and other proprietary programs (such as Delta Airline's mobile application) may also be automatically populated with the KED user's credentials and associated data files so that the KED user can immediately begin using the ICD as he or she would use his or her own iPad without having to manually enter credentials or transfer data files. In the case of an ICD in the form of a vehicular infotainment system, the KED user's music, destinations and station preferences are automatically loaded into the infotainment system and the KED user's experience is virtually identical to the interaction with the infotainment system in his or her personal automobile.

Alternatively or additionally the ICD KAPs may be configured to in certain circumstances and for certain programs selectively prompt the user for authorization, which may include a PIN, prior to the transfer of the associated credentials and data files. For instance, in the case of a banking program on an iPad, the KAPs may be configured to, for security reasons, postpone transfer of the associated credentials and data until the KED user launches the banking program on the iPad and enters a separate and additional security code, which may be the same or different than the security code associated with the user credentials for the banking program.

In order to facilitate the foregoing, the ICDs OS may be configured to cooperatively manage various user profiles. The ICD may automatically log out from any previous user (with or without prompting that current user) and log in as the KED user. Conventional techniques may be used to preserve system state information for the previous user or run in parallel multiple sessions, one for each user.

For additional security, and as shown in FIG. 1, the remote, KAP-equipped proprietary servers may require direct communication from the KED in order to authorize access of the user's account by the ICD. For instance, the KED may transfer to the ICD guest credentials which are recognized by the remote KAP-equipped proprietary servers. The guest credentials are accepted by the KAP-equipped servers only upon the receipt of a confirmation directly from the KED's KAP that the access is authorized.

Figure 15:
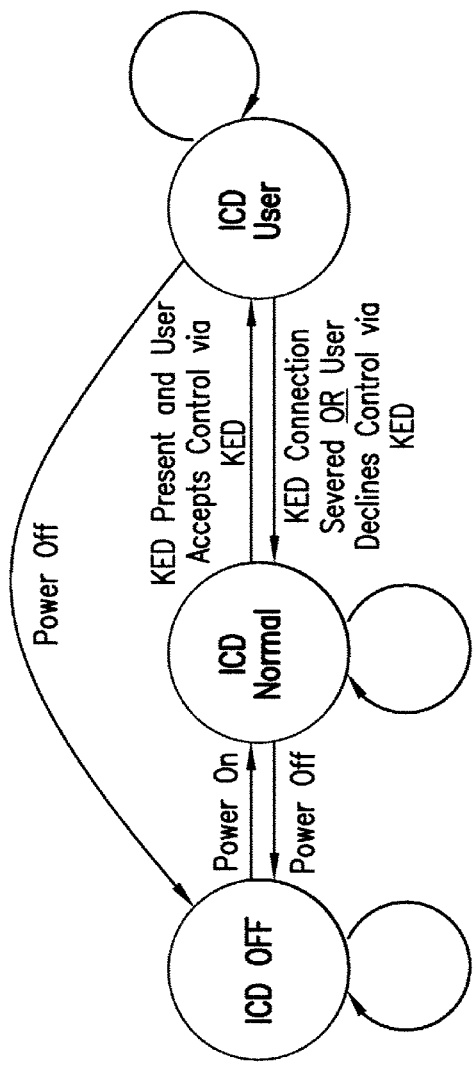
FIG. 15 is a state diagram for an illustrative Keystone embodiment.

FIG. 15 is a state transition diagram for an ICD in an illustrative embodiment. ICD OFF is the state in which the ICD has no power applied, and no operations are being executed. In this mode, the KED may or may not be operating autonomously. The only way to transition out of this mode is to power up the system, which can be done by either by connecting power, and/or turning on a power switch. This state can be transitioned to from any other state by disconnecting power, and/or turning off a power switch.

ICD NORMAL is a state in which the ICD has been powered up from the ICD OFF state and is operating normally. This can be accomplished by connecting power and/or turning on a power switch. Here, Normal is defined as the ICD being under its own control, having access to its own servers and data. It is possible to transition from this state to the ICD OFF state should power be turned off at any time. Another function which may be performed while in this state is polling of KEDs that may be within range. If a KED is detected, a request is sent to the KED to ask the user if the KED is going to enable the ICD to act as the KED user device.

ICD USER is a state in which the ICD is used by the user, having access to the user's servers and other user data (such as data in the KED, for example). This state transitions to ICD OFF upon disconnection of power. This state can also transition into ICD Normal if the KED becomes severed (e.g., out of range), or the user decides to return control of the ICD to its normal state.

In one mode of operation, upon receipt of a power-up command the ICD transfers to a normal operating state wherein other users are controlling the ICD. Upon detection of KED presence and KED user's acceptance of the linking of the ICD, the ICD transfers to the control of the KED user. As discussed above, the ICD operating system may be optionally configured to maintain independent sessions for the other users and the KED user such that, upon disconnection of the KED the ICD operating system transitions to servicing the non-KED user session(s).

The operation of the Keystone system will now be described from the perspective of the KED. The handheld device has disposed thereon the KAP, which manages a plurality of data files and plurality of credentials associated with a user of the KED. The KAP prompts the user for authorization from the user to establish a secure short range wireless personal area network session (such as a Bluetooth link) between the handheld computing device and the ICD. The KAPs on the KED and ICD cooperate to establish a secure short range wireless personal area network session. The KED KAP transmits to the ICD KAP credentials for accessing a plurality of services via remote servers, such as YahooMail, Netflix, Pandora, Vudu, XM Radio and the like. The KED KAP also transmits to the ICD KAP bookmark files, documents, pictures and other files to which the user would like to have access on the ICD. The KED KAP also transmits, on an independent data channel such as a cellular data network, to the YahooMail, Netflix, Vudu, Pandora and XM Radio servers KAPs requests to authorize the ICD to access the corresponding accounts of the user. The KAPs may be configured to automatically terminate the session unless the ICD and/or remote server KAPs continue to receive periodic session authorization requests from the KED KAP. The session is terminated either by disconnecting the KED from the personal area network or by the KED KAP transmitting a command to terminate the session.

The operation of the Keystone system will now be described from the perspective of the ICD. The ICD has disposed thereon the KAP, which receives from the KED KAP a plurality of data files and plurality of credentials associated with a user of the KED. The ICD KAP, upon detection of the KED, requests authorization from the KED to establish a secure short range wireless personal area network session between the handheld computing device and the ICD. The ICD KAP establishes, in response to the authorization, a secure short range wireless personal area network session between the KED and the ICD. The ICD then receives from the KEP KAP credentials for accessing a plurality of services via remote servers such as YahooMail, Netflix, Pandora, Vudu, XM Radio and the like. The ICD KAP also receives from the to the KEP KAP bookmark files, documents, pictures and other files to which the user would like to have access on the ICD. The ICD transmits, on an independent data channel such as a wired or wireless internet connection via a cable modem, to the YahooMail, Netflix, Pandora, Vudu, XM Radio servers requests to access the corresponding accounts of the user. The ICD KAP may be configured to automatically terminate the session unless the ICD KAPs receives periodic and continued session authorization requests from the KED KAP. ICD KAP also terminates the session when it detects that the KED disconnects from the personal area network or when the ICD receives from the KED KAP a command to terminate the session. Upon termination the ICD KAP may delete, encrypt, or otherwise restrict access to the user credentials and data files supplied by the KED KAP.

It is noted that this architecture assumes compatible software is disposed on the KED, ICD and remote servers. Each of the KAPs will have unique and different functionality, especially at the application level (although the server KAPs may not have an application layer), but each will be interoperable such that the above described KAP sessions may be established, managed and terminated. In preferred embodiments, the KAP software will have have a common architecture and common session-layer modules to facilitate interoperability in systems where the KED, ICD and remote servers each run different operating systems.

A number of embodiments have been described. Nevertheless, it will be understood that various modifications are optionally made without departing from the spirit and scope of this disclosure. Accordingly, other embodiments are within the scope of the following claims.

What is claimed is:

1. A method for enabling remote services on an internet coupled device (ICD), comprising:
providing, on a handheld computing device, a first application program;
establishing, on a first communication link between the handheld device and the ICD, a short range wireless network connection between the handheld computing device and the ICD, wherein the ICD is a personal computer or a television and wherein the network connection is via Bluetooth or wi-fi;
transmitting, via the first communication link to a second application program on the ICD, credentials for accessing a plurality of services via one or more remote servers;
transmitting, on a second communication link between the ICD and the one or more remote servers, a request to authorize the ICD to access one or more accounts of the user;
transmitting to the handheld device along a third communication link directly between one or more remote servers and the handheld device, a request to verify that the ICD is to be given access to one or more accounts of a user of the handheld computing device;
receiving, at the ICD and along the second communication link, a multimedia stream associated with the one or more user accounts in response to a verification provided by the handheld device that the ICD is to be given access to one or more accounts of the user; and
terminating, in response to the handheld computing device leaving communication range of the ICD, the rights of the ICD to access the one or more user accounts via the second communication link.

2. The method of claim 1, wherein the handheld computing device transmits, to the second application program on the ICD, internet browser bookmark files.

3. The method of claim 2, wherein the handheld computing device transmits, to the second application program on the ICD, an email account password and username.

4. The method of claim 3, wherein the handheld computing device transmits, to the second application program on the ICD, documents commonly accessed by the user at a primary personal computer.

5. The method of claim 4, wherein the handheld computing device transmits, to the second application program on the ICD, audio files.

6. The method of claim 5, wherein the third communication link is along a cellular network.

7. The method of claim 6, wherein the handheld computing device transmits, to the second application program on the ICD, credentials which enable the ICD to download streaming video from a remote server via the user's account.

8. The method of claim 7, wherein the handheld computing device transmits, to the second application program on the ICD, credentials which enable the ICD to download streaming audio from a remote server via the user's account.

9. The method of claim 8, wherein the handheld computing device transmits to the ICD application program credentials for at least three distinct third party services provided by the remote servers.

10. The method of claim 9, wherein the handheld computing device transmits, on the third communication link, a request to authorize the ICD to access at least three distinct user accounts.

* * * * *